United States Patent [19]
Garces

[11] Patent Number: 5,850,132
[45] Date of Patent: Dec. 15, 1998

[54] APPARATUS USED WITH AC MOTORS FOR COMPENSATING FOR TURN ON DELAY ERRORS

[75] Inventor: Luis J. Garces, Mequon, Wis.

[73] Assignee: Allin-Bradley Company, LLC, Milwaukee, Wis.

[21] Appl. No.: 887,488

[22] Filed: Jul. 2, 1997

[51] Int. Cl.[6] ................................. G05B 11/28
[52] U.S. Cl. .............. 318/599; 318/811; 318/254; 363/41
[58] Field of Search .................... 318/254, 439, 318/599, 629, 798–811; 363/39–41, 43–48

[56] References Cited

U.S. PATENT DOCUMENTS

| | | | |
|---|---|---|---|
| 4,597,037 | 6/1986 | Okado | 363/41 |
| 5,099,408 | 3/1992 | Chen et al. | 363/41 |
| 5,450,306 | 9/1995 | Garces et al. | 363/41 |
| 5,495,918 | 3/1996 | Peruggi et al. | 318/807 X |
| 5,541,484 | 7/1996 | DiTucci | 318/254 |
| 5,610,806 | 3/1997 | Blasko et al. | 363/41 |
| 5,627,447 | 5/1997 | Unsworth et al. | 318/801 |
| 5,701,066 | 12/1997 | Matsuura et al. | 318/808 |
| 5,736,825 | 4/1998 | Kaura et al. | 318/599 |

*Primary Examiner*—Brian Sircus
*Attorney, Agent, or Firm*—Michael A. Jaskolski; John M. Miller; John J. Horn

[57] ABSTRACT

An apparatus for compensating for turn on delay distortions generated by a PWM controller. When turn on delay compensation is added to a PWM controller command signal and current zero crossings are inaccurately determined, compensation at the zero crossings causes further distortion which is reflected in a d and q-axis current vector frequency. Deviations from an ideal vector frequency are identified and used to modify command voltages to eliminate the zero crossing errors.

17 Claims, 6 Drawing Sheets

APPARATUS USED WITH AC MOTORS FOR COMPENSATING FOR TURN ON DELAY ERRORS

CROSS-REFERENCE TO RELATED APPLICATIONS

Not applicable.

FEDERALLY SPONSORED RESEARCH

Not applicable.

BACKGROUND OF THE INVENTION

The present invention relates to variable frequency AC motors and more particularly, to a method and apparatus to compensate for voltage deviations at motor terminals due to switching time delays in pulse width modulated invertors.

One type of commonly designed induction motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Figure 1:
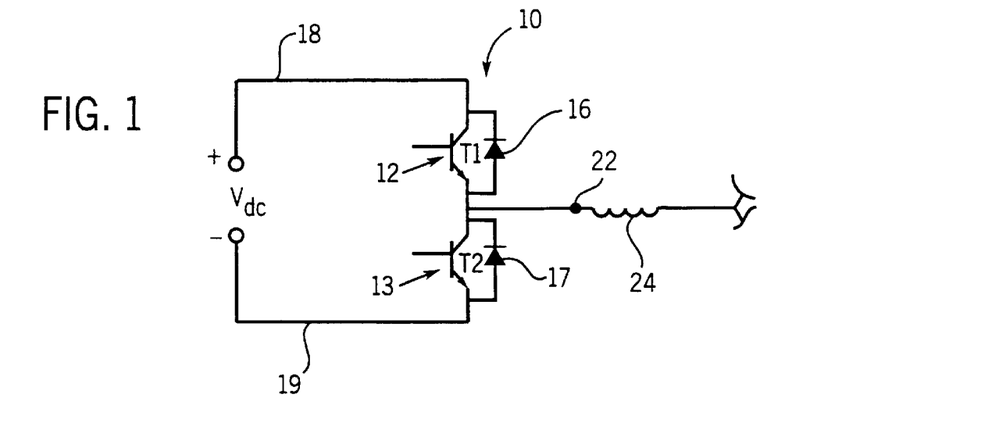
FIG. 1 is a schematic of a single leg of a three phase PWM inverter.

Many ASD configurations include a pulse width modulated (PWM) inverter consisting of a plurality of switching devices. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control both the amplitude and frequency of voltage that are eventually provided across windings 24.

Figure 2:
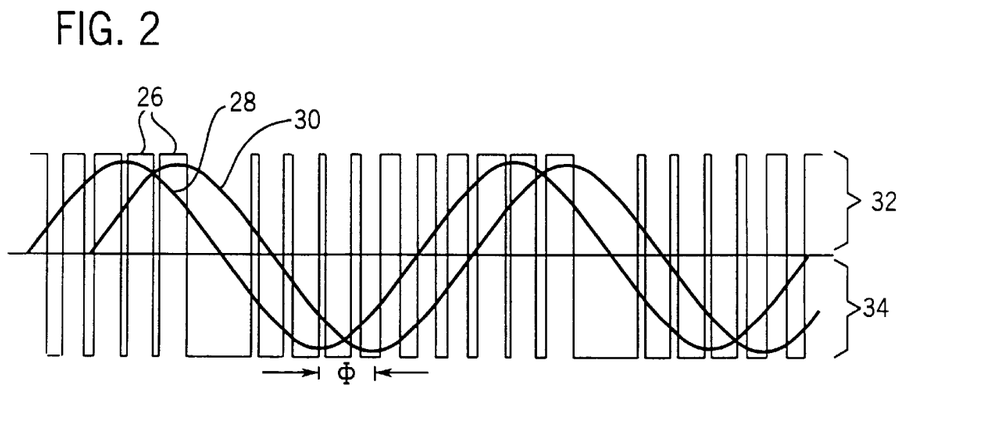
FIG. 2 is a graph illustrating a high frequency pulse train applied to a stator winding and a resulting low frequency alternating voltage and current.

Referring to FIG. 2, an exemplary sequence of high frequency voltage pulses 26 that an inverter might provide to a motor terminal can be observed along with an exemplary low frequency alternating fundamental voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the low frequency alternating voltage 28 that drives the motor. The low frequency alternating voltage 28 in turn produces a low frequency alternating current 30 that lags the voltage by a phase angle Φ.

Figure 3A:
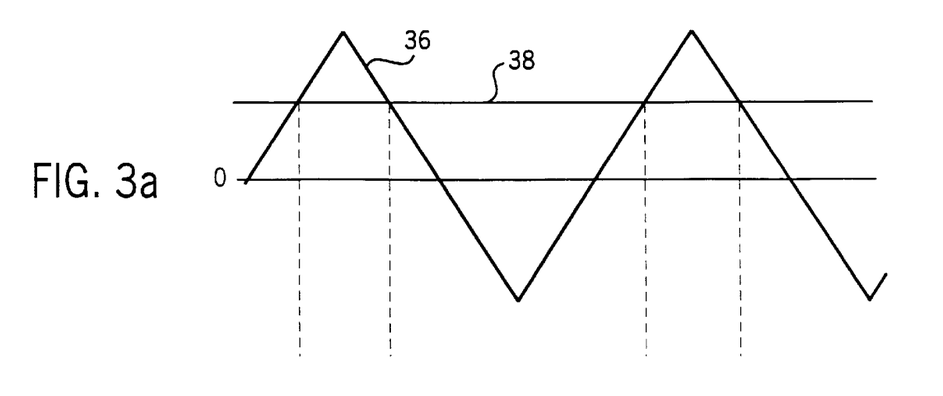
FIG. 3a is a graph illustrating the waveforms used by a PWM inverter to produce the high frequency pulses shown in FIG. 2, FIGS. 3b, 3c, 3e, and 3f are graphs illustrating PWM firing pulses.

The hardware which provides the firing pulses to the PWM inverter is typically referred to as a signal generator. Referring to FIG. 3(a), illustrative waveforms used by a signal generator to generate the firing pulses for leg 10 may be observed. As well known in the art, a carrier waveform 36 is perfectly periodic and operates at what is known as the carrier frequency. A command voltage waveform 38 is sinusoidal, having a much greater period than the carrier waveform 36.

Figure 3B:
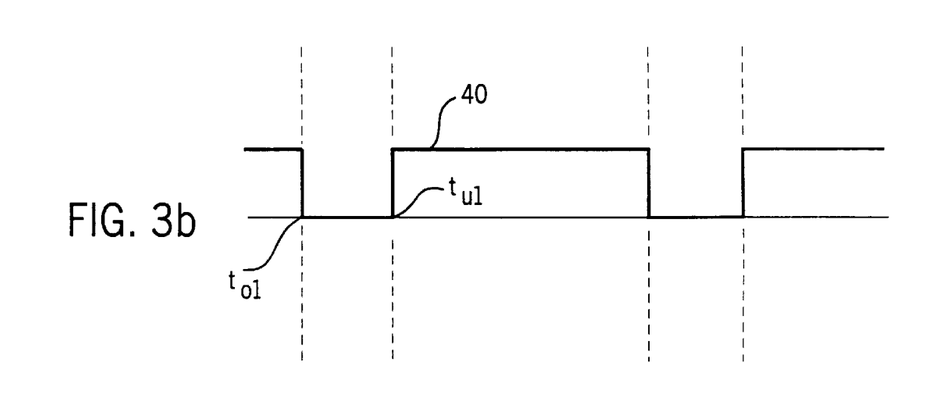
Figure 3C:
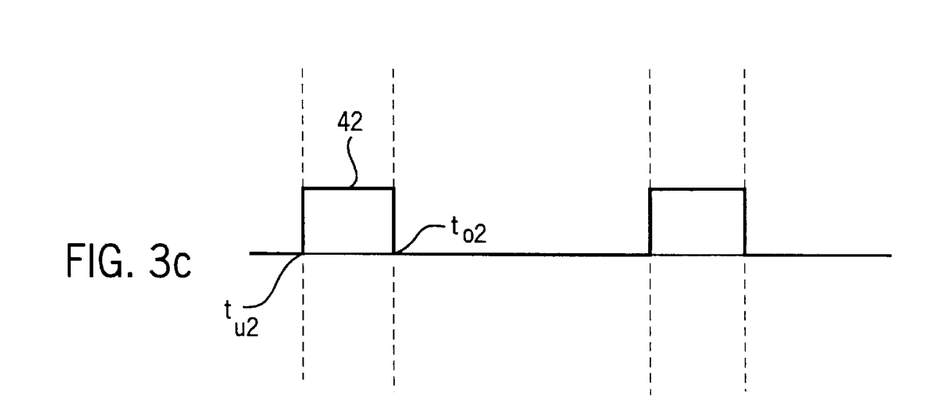

Referring also to FIGS. 3(b) and 3(c), an ideal upper signal 40 and an ideal lower signal 42 that control the upper and lower switches 12, 13 respectively can be observed. The turn-on $t_{u1}$, $t_{u2}$ and turn-off $t_{o1}$, $t_{o2}$ times of the upper and lower signals 40, 42 come from the intersections of the command waveform 38 and the carrier waveform 36.

When the command waveform 38 intersects the carrier waveform 36 while the carrier waveform has a positive slope, the upper signal 40 goes OFF and lower signal 42 goes ON. On the other hand, when the command waveform 38 intersects the carrier waveform 36 while the carrier waveform has a negative slope, the upper signal 40 goes ON and the lower signal 42 goes OFF. Thus, by comparing the carrier waveform 36 to the command waveform 38, the state of the upper and lower signals 40, 42 can be determined. The upper and lower signals 72, 74 are provided to the delay module 11.

Figure 3D:
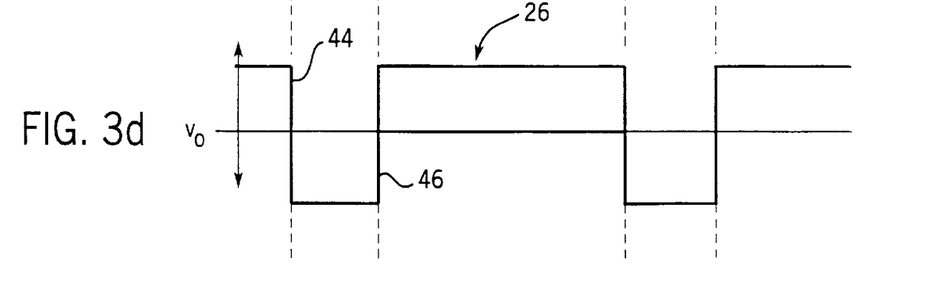
FIGS. 3d and 3g are graphs illustrating high frequency pulses delivered to a motor terminal.

Referring also to FIGS. 2 and 3(d), an ideal high frequency voltage pulse 26 resulting from the ideal upper and lower signals 40, 42 in FIGS. 3(b) and 3(c) that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON.

While advanced digital electronic signal generators can produce the desired high frequency signals to turn inverter components ON and OFF, the inverter components cannot turn ON and OFF instantaneously. Ideally, when one switch 12 turns on, the series switch 13 turns OFF, and visa versa.

In reality, however, each switch 12, 13 has turn-on and turn-off times that vary depending on the technology used for their construction. Thus, while signals to turn the upper switch 12 ON and the lower switch 13 OFF might be given at the same instant, the lower switch 13 may go OFF slower than its command leading to a condition where both switches are conducting thus providing an instantaneous DC short between a high DC rail 18 and a low DC rail 19. Such a DC short can cause irreparable damage to both the inverter and motor components.

Figure 3E:
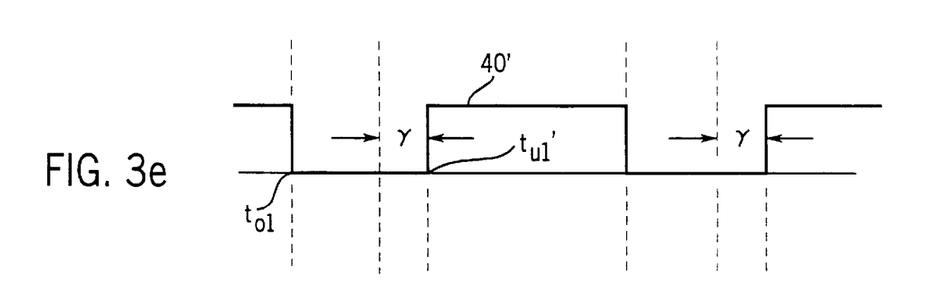
Figure 3F:
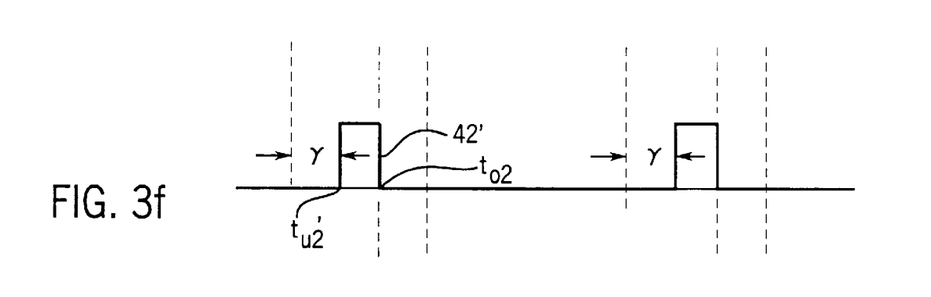

To ensure that the series switches of an inverter are never simultaneously on, a delay module is typically provided to introduce a turn-on delay between the times when one switch turns off and the other switch turns on. The delay module modifies the upper and lower signals 40, 42 by adding a turn-on delay period γ prior to the turn-on times $t_{u1}$, $t_{u2}$ of each of the upper and lower signals 40, 42. Referring to FIGS. 3(e) and 3(f), the delay periods γ produce delayed and shortened upper and lower signals 40' and 42' having delayed turn-on times $t_{u1}'$, $t_{u2}'$.

Figure 3G:
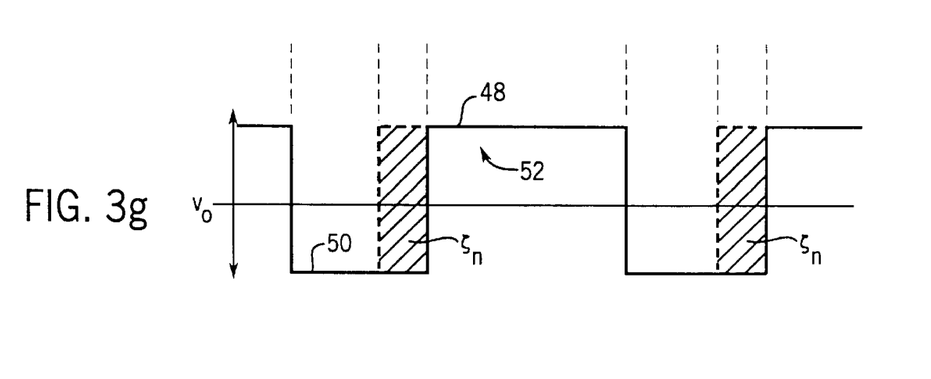

Referring to FIG. 3(g), while the delay periods γ protect the motor and inverter components, they produce voltage deviations $\zeta_n$ at the motor terminal 22 that produce distorted positive and negative phases 48, 50 and a distorted high frequency voltage pulse 52. These deviations $\zeta_n$ can best be understood by referring to FIGS. 1, 2, and 3(e)–3(g).

Referring to FIGS. 1, 2 and 3(e)–3(g), while the terminal current 30 at motor terminal 22 might be positive, the high frequency voltage pulses 26 will be oscillating from positive to negative phase as the delayed upper and lower signals 40', 42' turn the switches 12, 13 ON and OFF. Thus, while the terminal current 30 is positive, two signal states may occur. First, the upper signal 40 may be OFF while the lower signal 42 is ON and second the upper signal 40 may be ON while the lower signal 42 is OFF. Likewise, when the current 69 is negative, the same two signal states may exist.

When the terminal current is positive and switch 12 is ON while switch 13 is OFF, the high voltage rail 18 is connected to motor terminal 22. Diode 17 blocks the flow of current to the low voltage rail 49. When the upper switch 12 turns OFF at $t_{o1}$, both series switches 12, 13 remain OFF during the delay period γ. As well known in the art, motor winding 24 operates as an inductor at terminal 22. Because of motor winding inductance, current 30 caused by voltage 28 cannot change directions immediately to become negative each time the high frequency voltage pulse 26 changes from the positive 32 to the negative 34 phase. The current remains positive and diode 17 immediately begins to conduct at $t_{o1}$ connecting the low voltage rail 19 to terminal 22 as desired. Hence, the terminal voltage goes negative at the desired time $t_{o1}$ even though the turn-on time $t_{u2}$ of the delayed lower signal 42' does not occur until after the delay period γ.

On the other hand, when switch 12 is initially OFF and switch 13 is ON and the terminal current 30 is positive, the low voltage rail 19 is connected through switch 13 to terminal 22 as desired and the resulting terminal voltage pulse 52 is in the negative phase 50. When switch 13 turns OFF at $t_{o2}$, as the positive terminal current 30 cannot immediately reverse itself, diode 17 conducts and low voltage rail 19 is again connected to terminal 22 for the duration of delay period γ. Thus, during the delay period γ, instead of having positive phase voltage at terminal 22 as desired, the negative phase 50 of the resulting terminal voltage pulse is extended until the turn-on time $t_{u1}'$ of delayed upper signal 72'.

Comparing FIGS. 3(d) and 3(g), the resulting terminal voltage pulses 52 have wider negative phases 50 and narrower positive phases 48 than the ideal voltage pulses 26. A voltage deviation $\zeta_n$ occurs each time the lower switch 13 is turned OFF and the terminal current 30 is positive. As well known in the art a similar type of deviation $\zeta_n$ of opposite polarity is produced when the terminal current 30 is negative and the upper switch 12 turns from ON to OFF.

Figure 4A:
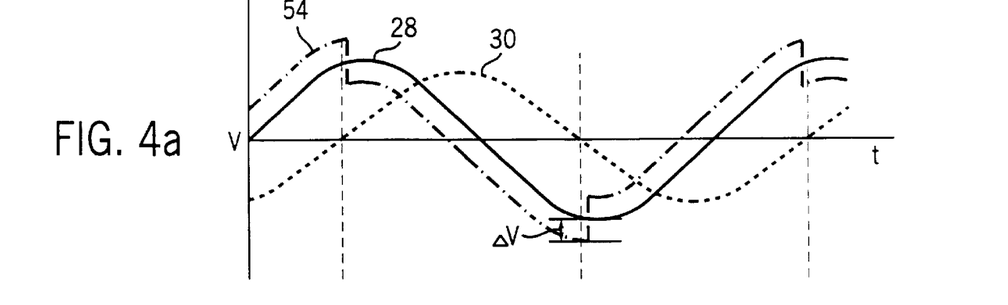
FIG. 4a is a graph illustrating ideal stator voltage and current and actual stator voltage prior to delay compensation and FIG. 4b is a graph illustrating a turn-on delay correction voltage.

While each individual deviation $\zeta_n$ does not appreciably affect the fundamental alternating voltage, accumulated deviations do distort the low fundamental frequency alternating voltage 28 and resulting current 30 thereby causing undesirable torque pulsations. Referring to FIG. 4a, an ideal terminal voltage 28 and associated current 30, and an actual terminal voltage 54 generated without compensating for turn on delay periods are illustrated. While the ideal voltage 28 and current 30 are purely sinusoidal, the actual voltage 54 is distorted by the $\zeta_n$ deviations. During positive terminal current 30 periods the actual voltage amplitude is reduced from the ideal amplitude by a value ΔV which can be expresses as:

$$\Delta V = \zeta_n * V_{dc} * f_{PWM} \qquad \text{Eq. 1}$$

where $V_{dc}$ is the DC voltage and $f_{PWM}$ is the carrier frequency of the PWM inverter. Similarly, during negative terminal current 30 periods the actual voltage amplitude is increased from the ideal amplitude by ΔV.

Figure 4B:
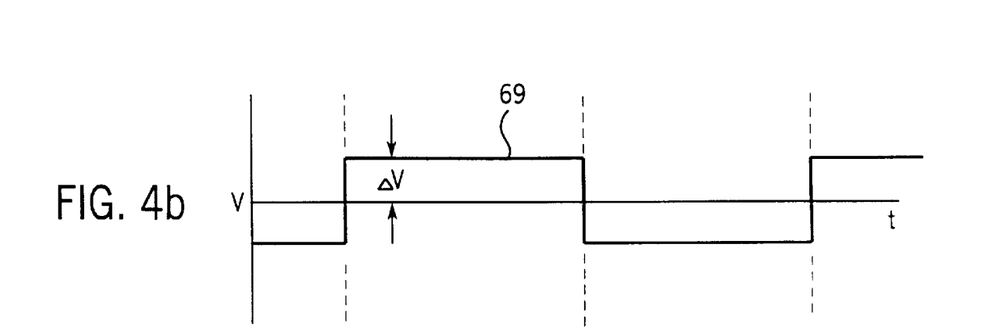

To compensate for terminal voltage deviations related to turn on delays the industry has tried various methods of adding and subtracting correction waveforms to the command signals used by the signal generator to derive firing signals for the PWM inverter. For example, referring also to FIG. 4b, because terminal voltage deviations are periodic, a periodic correction voltage 69 can be added to the command signal prior to comparison to the carrier signal. During positive current 30 periods, because turn on delays reduce the output voltage by ΔV, by adding a correction voltage 69 equal to voltage ΔV to the command signal, the deviation should be compensated. Similarly, during negative current 30 periods, because turn on delays increase the output voltage by ΔV, by subtracting a correction voltage 69 equal to voltage ΔV from the command signal, the deviation should be compensated. Thus, the correction signal 69 is positive and equal to ΔV when current 30 is positive and is negative and equal to ΔV when current 30 is negative.

To implement this type of compensation, typically current sensors are provided which determine when a terminal current 30 crosses zero. Each time the current 30 crosses zero the correction voltage 69 is changed from positive to negative or vice versa, depending on the change in current 30 (i.e. when current 30 goes from negative to positive, correction voltage 69 goes positive and when current 30 goes from positive correction voltage to negative, correction voltage 69 goes negative).

This type of turn on delay compensation works well when the precise time of the current 30 zero crossings can be determined. Unfortunately, limitations inherent in the PWM system often make it difficult to precisely determine current zero crossing times.

Figure 5A:
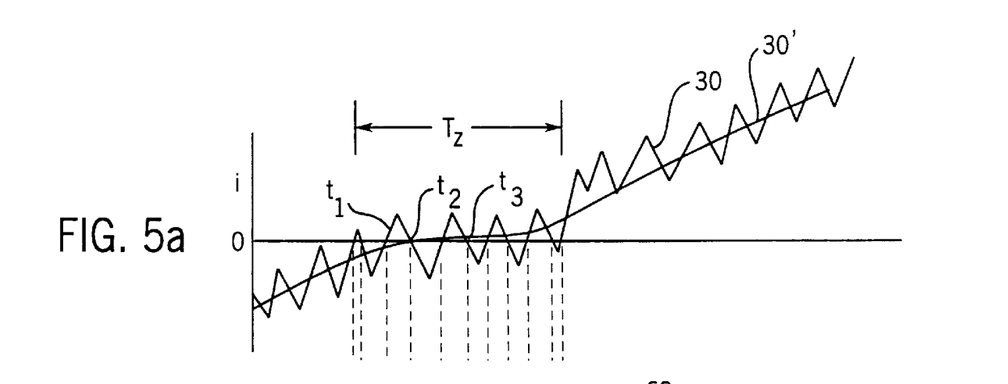
FIG. 5a is a graph illustrating stator current and FIG. 5b illustrates turn-on delay correction voltage during a zero crossing period.

Referring to FIG. 5a, a zero crossing of a typical terminal current 30 has been enlarged. While the overall shape of current 30 is essentially sinusoidal (see FIG. 4a), because the current is generated using a PWM inverter it will typically include instantaneous ripple oscillating up and down about an average sinusoid. During a zero crossing period $T_z$, because of ripple, current 30 does not cleanly cross the zero value at a single instant in time. In fact, current 30 crosses the zero value several times during each zero crossing period $T_z$ as it oscillates between positive and negative values about zero. For this reason current 30 tends to remain approximately zero during period $T_z$.

Figure 5B:
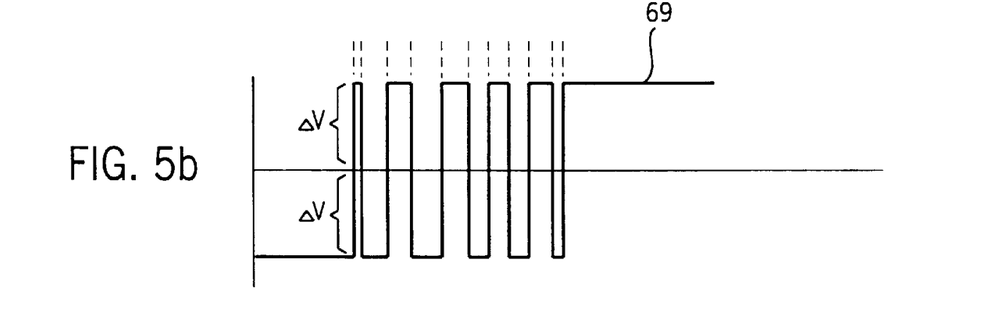

Referring also to FIG. 5b, each time current 30 crosses zero, the polarity of correction voltage 69 changes to compensate for turn on delays. Thus, during zero crossing period $T_z$, voltage 69 oscillates between plus and minus ΔV values. Correction voltage oscillation in itself is not objectionable, after all, when current 30 is positive it is advantageous to have a positive correction voltage and when current 30 is negative it is advantageous to have a negative correction voltage to compensate for current through diodes 17 and 19. However, because diodes 17 and 19 do not conduct efficiently during the zero crossing period $T_z$, instead of correcting for turn on delays during periods $T_z$, causes further distortion.

For example, referring to FIGS. 1 and 5a, assume the magnitude of current 30 between times $t_1$ and $t_2$ is insufficient to turn on diode 17 when switches 12 and 13 are both OFF. In this case the diode 17 does not cause an error $\zeta_n$ during the turn on delay. However, because current 30 is positive between times $t_1$ and $t_2$, the command voltage and hence the terminal voltage are increased by the correction angle resulting in a terminal voltage distortion.

One way to reduce period $T_z$ distortion is to filter the current signal 30 to reduce the ripple. A filtered signal 30' is illustrated in FIG. 5a. While the filtered signal 30' reduces correction voltage oscillation about the zero crossing, the current 30' still remains at approximately zero during the zero crossing period $T_z$ which makes it extremely difficult to determine a correct zero crossing time for turn on delay compensation purposes.

Current sampling speed is limited by both hardware and software and therefore, while an ideal zero crossing time may be $t_3$, typical current sensors may detect the zero crossing to be any time within the zero crossing period $T_z$.

Thus, it would be advantageous to have a system which can accurately compensate for turn on delay distortion by increasing accuracy of current zero crossing detection and compensating for remaining zero crossing error.

BRIEF SUMMARY OF THE INVENTION

The present invention includes an apparatus having a phase locked loop (PLL) for determining accurate current zero crossing times which are used by a turn on delay compensator to add correction voltages to command signals for generating desired terminal voltages. However, because of current sensing limitations, zero crossings can not be precisely determined and therefore terminal voltage distortions cannot be completely compensated in this manner. Therefore, the present invention also includes a correction module which receives a current phase error signal from the PLL and uses the error signal to derive a second correction voltage which is also added to the command voltage to better compensate for voltage distortion.

Referring again to FIG. 2, during steady state operation the single phase current 30 should be completely sinusoidal such that the phase angle Φ remains constant. However, referring also to FIG. 5a, current 30 remains approximately zero during the zero crossing period $T_z$. This imperfection in the crossing causes a decrease in the instantaneous current frequency which means that phase angle Φ also deviates from its steady state value during periods $T_z$.

Figure 6:
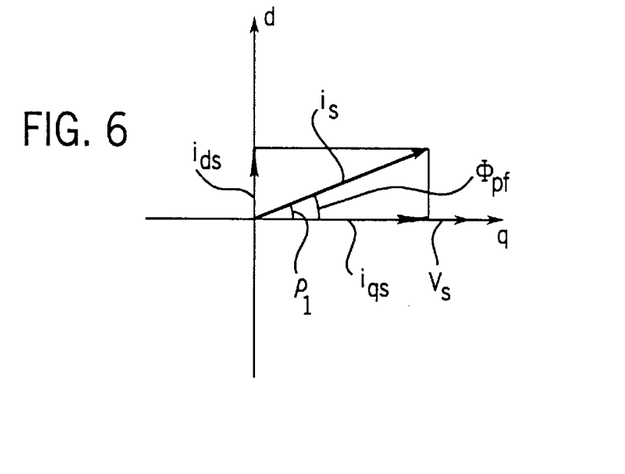
FIG. 6 is a graph depicting stator current and d and q-axis current components.

Referring also to FIG. 6, as well known, the three separate stator currents can be visualized as a single current vector $i_s$ a two axis Cartesian reference frame. The same can be said for the vector representing the three fundamental components of the stator voltages $V_s$. In steady state, both vectors rotate about the Cartesian reference frame at a vector frequency $f_v$. The current vector $i_s$ lags the voltage vector $V_s$ by a power factor angle $\phi_{pf}$.

As vector $i_s$ rotates, it forces a phase angle $\rho_1$ with respect to one of the axis of the Cartesian reference frames (e.g. the q-axis). When one of the currents passes through zero during a zero crossing period, angle $\rho_1$ deviates from its steady state rate of change. This instantaneous deviation of the angle $\rho_1$ causes also a change of the power factor angle $\phi_{pf}$ which causes instantaneous and periodic deviations in the produced motor torque. By increasing stator voltages just prior to an associated phase current crossing zero, the associated zero crossing period $T_z$ is essentially eliminated or is at least substantially reduced so that there is less zero crossing error. By monitoring angle $\rho_1$, zero crossing errors can be identified and then compensated via the second correction voltage.

The second correction voltage is used to compensate the voltage associated with the next current to cross through zero and thereby substantially reduces the terminal voltage error.

Thus, one object of the present invention is to reduce the duration of the current zero crossing period $T_z$. Another related object is to eliminate turn-on delay errors by providing turn-on delay compensation. Still another object is to provide turn-on delay compensation which is precise at current zero crossings such that the rate of change of phase angle $\rho_1$ (see FIG. 6) between current vector $i_s$ and torque current $i_{qs}$ remains constant, thus reducing torque ripple.

Other and further aspects and objects of the present invention become apparent during the course of the following description and by reference to the accompanying drawings.

DETAILED DESCRIPTION OF THE INVENTION

A. Theory

Referring again to FIG. 6, the three stator voltages $V_u$, $V_v$ and $V_w$ provided to drive a motor can be represented by a single voltage vector $V_s$ in a d and q frame of reference which rotates at a constant frequency during ideal steady ideal operation. Similarly, the three phase currents $i_u$, $i_v$ and $i_w$ which are caused by phase voltages $V_u$, $V_v$ and $V_w$ can be represented by a single two component current vector $i_s$ which lags voltage vector $V_s$ by angle $\Phi_{pf}$. Current vector $i_s$ includes two components, a first component $i_{qs}$ and a second component $i_{ds}$ which lags the first component by 90°. Vector $i_s$ rotates about the d–q frame of reference at vector frequency $f_v$ and as it rotates, a phase angle $\rho_1$ with a stationary reference changes.

The rate of change of angle $\rho_1$ should always remain constant during steady state motor operation. Unfortunately, each time one of the three stator currents $i_u$, $i_v$ or $i_w$ passes through zero and levels off at approximately a zero level, the vector frequency $f_v$ of rotation of the vector is altered and the rate of change of angle $\rho_1$ deviates from its steady state value. The current disturbance reflected by the rate change results in undesirable torque pulsations.

To eliminate the torque pulsations the voltages which give rise to the stator currents $i_u$, $i_v$ or $i_w$ can be altered to effectively force the resulting currents $i_u$, $i_v$ and $i_w$ to cross through the zero level more rapidly so that the zero crossing period $T_z$ is either eliminated or substantially reduce each time a phase angle error is detected. To this end, at least two of the three stator currents $i_u$, $i_v$ or $i_w$ are sensed and transformed into two phase stationary two-axis d–q currents $i_{ds}$ and $i_{qs}$. These two current components represent a vector rotating in steady state at the frequency $f_v$ and with an angle $\rho_1$ with respect to the axis d of the d–q reference frame. From FIG. 6 it can be seen that:

$$i_{qs} = i_s \cos \rho_1 \qquad \text{Eq. 2}$$

and:

$$i_{ds} = i_s \sin \rho_1 \qquad \text{Eq. 3}$$

Figure 7:
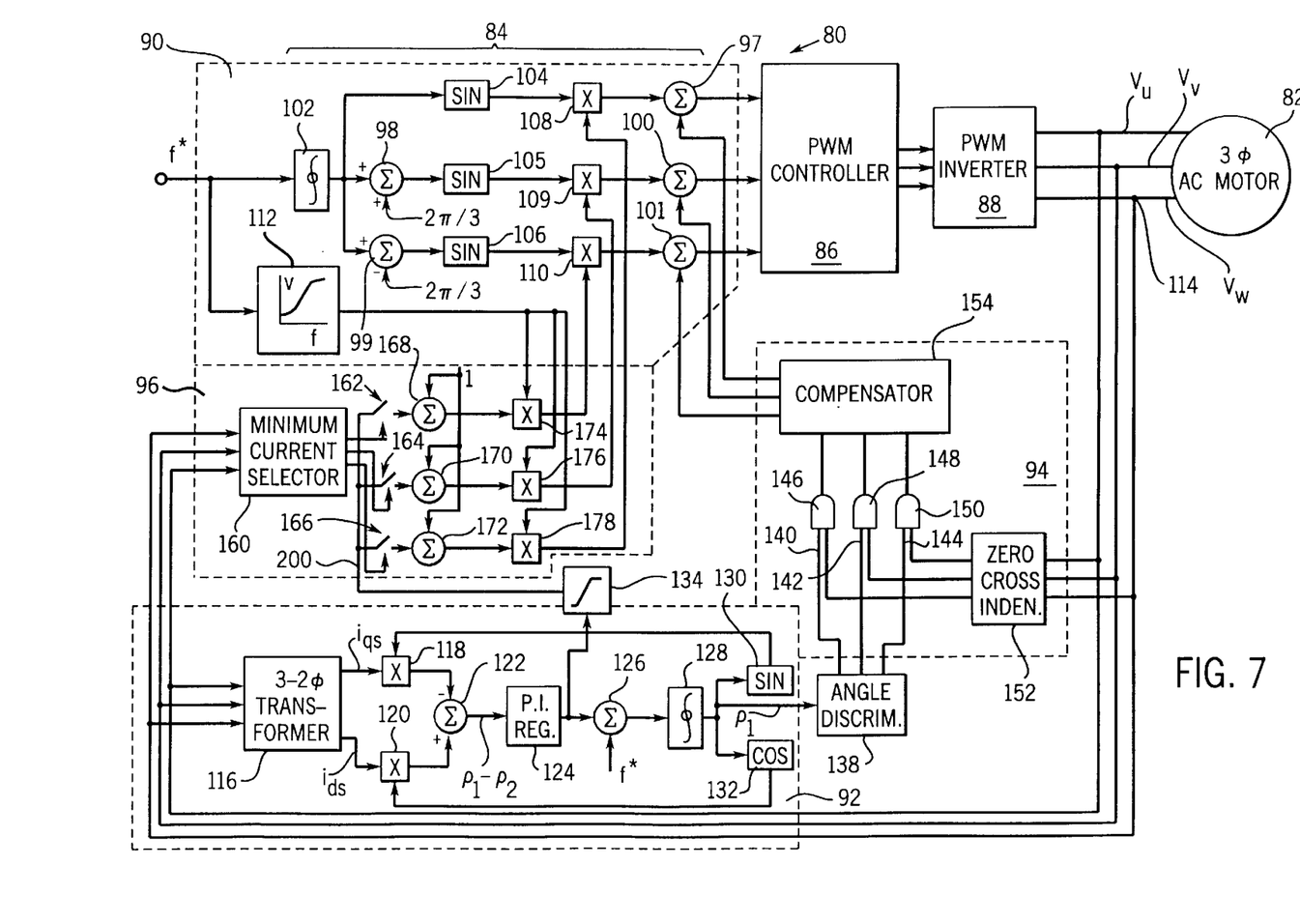
FIG. 7 is a schematic of the inventive controller.

Instantaneous currents $i_{ds}$ and $i_{qs}$ are fed to a two axis phase locked loop (PLL) 92 in FIG. 7 which determines at its output, another vector $i_{sPLL}$ with constant amplitude and an angle $\rho_2$ with respect to the previously defined q axis. In steady state, and if the input currents ids and iqs are really sinusoidal, the angle $\rho_1$ and $\rho_2$ are identical and the input and output vector of the PLL will be rotating at the same vector frequency $f_v$. However, where one of the phase currents $i_u$, $i_s$ or $i_w$ crosses zero, due to the previously explained current distortion, the angular frequency of the input and output vector will be different and the phase angle $\rho_1$ will not be equal to $\rho_2$.

The PLL performs the task of keeping the phase difference between the angle $\rho_1$ of the stator vector $i_s$ and of the output vector $i_{sPLL}$ to a minimum. To this end, the phase difference $(\rho_1 - \rho_2)$ is calculated and fed to regulator 124 of FIG. 7. The outputs of the PLL, being of constant amplitude, could be considered to be the sine and cosine of the output angle $\rho_2$. The phase angle comparison $(\rho_1$ and $\rho_2)$ is accomplished by multiplying the sine of the angel $\rho_2$ by current $i_{qs}$ to generate a first factor, multiplying the cosine of angle $\rho_2$ by current $i_{ds}$ to generate a second factor, and subtracting the first from the second factor. In other words, error difference $(\rho_1 - \rho_2)$ is being approximated by the following trigonometric equation:

$$i_s \sin(\rho_1 - \rho_2) = (i_s \sin \rho_1)^* \cos \rho_2 - (i_s \cos \rho_1)^* \sin \rho_2 \qquad \text{Eq. 4}$$

Combining Equations 2, 3 and 4:

$$i_s \sin(\rho_1 - \rho_2) = i_{ds} \cos \rho_2 - i_{qs} \sin \rho_2 \qquad \text{Eq. 5}$$

For small errors between the two angles, the sine function can be approximated by the value of the angle difference in radians such that Equation 5 reduces to:

$$i_s \sin(\rho_1 - \rho_2) \propto i_s(\rho_1 - \rho_2) \qquad \text{Eq. 6}$$

In the PLL, each time $\rho_1 - \rho_2$ is not zero, regulator 124 generates a frequency $f_{vPLL}$ different from $f_v$.

It has been recognized that vector frequency errors are approximately proportional to voltage errors during the phase current zero crossings. Thus, according to the present invention, the frequency error from the PLL is used to reduce or eliminate the voltage errors in the phase which has a current crossing zero.

To compensate for the phase angle deviation, a voltage correction is added to, or subtracted from, the stator voltage associated with the current crossing zero. The additional voltage speeds up the zero crossing current transition and thus helps to eliminate the phase angle and vector frequency error, thus reducing torque pulsations.

B. Configuration

In the description that follows, an "*" denotes a "command" signal and an "s" subscript denotes that a signal is referenced to the stationary frame of reference.

Referring now to FIG. 7, the present invention will be described in the context of a motor drive 80 that receives a command frequency signal f* and produces voltages $V_u$, $V_v$ and $V_w$ to drive a motor 82 at the command frequency f*.

Drive 80 includes a command signal modulator 84, a PWM controller 86, a PWM inverter 88 and various other motor components which will be described in more detail below.

The inverter 88 includes a group of switching elements which are turned on and off to convert the DC voltage to pulses of constant magnitude. The inverter pulse train is characterized by a first set of positive going pulses of constant magnitude but of varying pulse width followed by a second set of negative going pulses of constant magnitude and of varying pulse width. The RMS value of the pulse train pattern approximates one cycle of a sinusoidal AC wave form. (See FIG. 2.) The pattern is repeated to generate additional cycles of the AC waveform. To control the frequency and magnitude of the AC power signals to the motor, control signals are applied to the inverter 88.

The control signals to drive the inverter 88 are provided by the PWM controller 86. Controller 86 receives three input signals and compares each of the input signals with a triangle carrier signal which has a much higher frequency than any of the input signals. When a sinusoidal input signal is greater than the carrier signal, a corresponding control signal provided to inverter 88 is high. When a sinusoidal input signal is less than the carrier signal, a corresponding control signal to inverter 88 is low.

The modulator 84 includes four different modules including a drive module 90, a phase locked loop (PLL) module 92, a dead time compensation module 94 and an angle correction module 96.

Drive module 90 includes five summers 97, 98, 99, 100 and 101, one integrator 102, three sine modules 104, 105 and 106, three multipliers 108, 109 and 110 and a voltage/frequency selector 112. Signal f* is provided to integrator 102 which integrates that signal and provides a phase angle to sine module 104, summer 98 and summer 99. Summer 98 phase shifts the phase angle by adding 120° while summer 99 phase shifts the phase angle by subtracting 120°. The outputs of summers 98 and 99 are provided to sine modules 105 and 106, respectively. Therefore, the angles provided to sine modules 104, 105 and 106 are all equispaced and separated from one another by 120 electrical degrees. The outputs of each of the sine modules 104, 105 and 106, are sine waveforms at the command frequency f* with a unity amplitude and which are out to phase by 120°.

Command signal f* is also provided to voltage/frequency selector 112 which correlates a command frequency with a suitable stator voltage, providing a stator voltage magnitude as an output. In most conventional controllers, the output of selector 112 would be provided to multipliers 108, 109 and 110 which would control the amplitude of the signals from sine modules 104, 105 and 106 accordingly.

In the present invention, however, the stator voltage magnitude from selector 112 is provided to phase angle correction module 96 which alters the stator voltage magnitude when necessary to compensate for turn on delay time which is not compensated via more conventional means. Module 96 will be described in more detail below.

The outputs of multipliers 108, 109 and 110 are provided to summers 97, 100 and 101 where each is added to a suitable turn on delay compensation signal which is provided by compensator module 94 to compensate for turn-on and turn-off delay times. The outputs of summers 97, 100 and 101 are then provided to PWM controller 86 and are used as the input voltages for comparison to the triangle carrier signal.

Referring still to FIG. 7, a single current feedback loop is provided. The feedback loop includes two or three current sensors (e.g., Hall affect sensors) collectively referred to by the numeral 114 which provide signals indicative of the three stator winding currents $i_u$, $i_v$ and $i_w$. The three currents are provided to PLL module 92, correction module 96 and compensation module 94.

The PLL module includes a three-to-two phase transformer 116, two multipliers 118, 120, two summers 122, 126, a proportional/integral PI regulator 124, an integrator 128, a sine module 130, a cosine module 132 and a limiter 134. Currents $i_u$, $i_v$ and $i_w$ are provided to transformer 116 which transforms the three phase currents into two phase stationary d and q-axis currents $i_{ds}$ and $i_{qs}$ according to the following equation:

$$\begin{bmatrix} i_{qs} \\ i_{ds} \end{bmatrix} = \frac{3}{2} \begin{bmatrix} 1 & 0 & 0 \\ \frac{1}{\sqrt{3}} & 0 & \frac{2}{\sqrt{3}} \end{bmatrix} \begin{bmatrix} i_u \\ i_v \\ i_w \end{bmatrix} \quad \text{Eq. 7}$$

The other components of the PLL module 92 implement Equation 6 above. To this end, currents $i_{ds}$ and $i_{qs}$ are provided by transformer 116. Integrator 128 provides phase angle $\rho_2$ to sine and cosine modules 130, 132, respectively, which provide the sine and cosine of phase angle $\rho_2$, respectively. Thus, multiplier 118 receives current $i_{qs}$ from transformer 116 and multiplies current $i_{ds}$ by the sine of phase angle $\rho_2$ to provide a first factor as an output. Similarly, multiplier 120 receives current $i_{ds}$ from transformer 116 and it multiplies that current by the cosine of angle $\rho_2$ providing a second factor as an output. Summer 122 subtracts the first factor from the second factor providing an output which indicates when the stator current phase angle $\rho_1$ has deviated from the steady state angle $\rho_2$.

The output of summer 122 will typically be zero. However, during current zero crossing periods when one of the three stator currents $i_u$, $i_v$ or $i_w$ approximately levels off to zero for a short time, there will be a non-zero output at summer 122 (i.e. $\rho_2-\rho_1 \neq 0$) The non-zero output is provided to the PI regulator 124 which steps up the angle difference $(\rho_1-\rho_2)$ as a function of the magnitude of the difference and provides the stepped up value to summer 126.

In addition to the stepped up value, summer 126 also received the command signal f* which is indicative of the desired stator current frequency. In steady state signal f* will not change over time. Moreover, if $\rho_1=\rho_2$ the output of PI regulator 124 will be zero. Output of summer 126 is provided to integrator 128 which generates phase angle $\rho_2$ which is provided to sine and cosine modules 130, 132, respectively, as described above. The stepped up signal from the PI regulator 124 is also provided to a limiter 134 which limits the maximum value of the stepped up signal prior to providing that value to the correction module 96. The maximum value allowed by the limiter 134 is $\Delta V_{PLL}$.

Thus, PLL module 92 provided both a phase angle signal $\rho_2$ and another signal on line 200 as a limiter output which indicates when the phase angle has changed (i.e. when $\rho_1-\rho_2 \neq 0$)

Phase angle $\rho_2$ is provided to an angle discriminator 138. Although not shown, discriminator 138 typically will include two summers, one of which adds 120° to angle $\rho_2$ and another which subtracts 120° from angle $\rho_2$. The discriminator 138 will also typically include a processor which can identify when the sine of any one of the three angle (i.e. $\rho_2$, $\rho_2-120°$, or $\rho_2+120$) equals zero. When sine $\rho_2$ equals 0°, discriminator 138 generates a signal via line 140 indicating a zero crossing. When sine $(\rho_2-120°)$ equals zero, discriminator 138 generates a signal via line 142 indicating a zero crossing. Similarly, when sine $(\rho_2+120°)$ equals zero, discriminator 138 generates a signal via line 144 indicating a zero crossing. Outputs 140, 142 and 144 are provided to three OR-gates 146, 148 and 150, respectively.

Currents $i_u$, $i_v$ and $i_w$ are also provided to a conventional zero crossing identifier 152 which simply tracks current polarity reversals and provides three outputs to OR-gates 146, 148 and 150, each output corresponding to a different one of the stator currents $i_u$, $i_v$ and $i_w$. Each OR-gate 146, 148 and 150 produces a separate signal indicating when either one or the other or both of its inputs have indicated a zero crossing and provides those signals to compensator 154. Compensator 154, in turn, generates signals like those illustrated in FIG. 4b to compensate for turn on delays in a conventional manner.

Referring still to FIG. 7, the correction module 96 includes a minimum current selector 160, three switches 162, 164 and 166, three summers 168, 170 and 172, and three multipliers 174, 176 and 178. The current selector 160 determines which of the three stator line currents $i_u$, $i_v$ or $i_w$ has the smallest absolute value and outputs a trigger signal to one of the switches 162, 164 or 166 corresponding to the stator current having the minimum absolute value. When one of the switches 162, 164 or 166 receives a signal, the switch is closed providing the limiter output on line 200 to an associated summer 168, 170 or 172. Each of the summers 168, 170 or 172 also receives a unity input which is added to either zero (when an associated switch 162, 164 or 166 is not closed) or is added to the limiter output (when an associated switch is closed).

The outputs of summers 168, 170 or 172 are provided to multipliers 174, 176 and 178 where the voltage magnitude signal from module 112 is multiplied by each of those values. The outputs of multipliers 174, 176 and 178 are provided to multipliers 108, 109 and 110 to set the amplitudes of command signals provided to summers 97, 100 and 101.

C. Operation

During steady-state operation, when none of the three stator winding currents are crossing zero, the current vector frequency will equal the command frequency f* and therefore the phase angles $\rho_1$ and $\rho_2$ will be equal. In this case, referring still to FIG. 7, the output of summer 122 will equal zero, the output of PI regulator 124 will equal zero and the input to all three summers 168, 170 and 172 will be zero. In this case module 96 will not effect motor operation.

However, as one of the stator winding currents $i_u$, $i_v$ or $i_w$ begins to cross through zero and level off at an approximately zero level for a zero crossing time interval $T_z$, the phase angle will change from its steady state level $\rho_2$. In this case, the output of summer 122 will become non-zero, the output of regulator 124 will increase as a function of the summer 122 output magnitude, the input to one of the summers 168, 170 or 172 will be increased, depending on which is the next stator winding current to cross zero, and therefore the voltage associated with the next stator winding current to cross zero will be increased via multipliers 174, 176, 178, 108, 109 and 110.

In addition, referring still to FIG. 7, when there is an error in the phase angle which shows up as a non-zero output from summer 122, regulator 124 output is increased as a function of the error and provided to summer 126. At summer 126 frequency f* is increased by the output of regulator 124 which thereby increases angle $\rho_2$ via integrator 128. Thus, dead time compensation provided by compensator 154 is altered when the vector frequency is reduced which thereby helps to increase the vector frequency.

D. Results

Figure 7A:
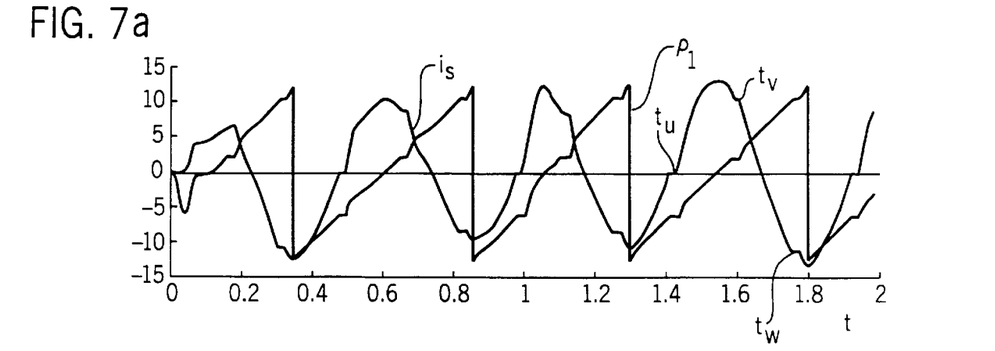
FIGS. 7a and 7b are graphs illustrating motor parameters where the invention is not employed.
Figure 7B:
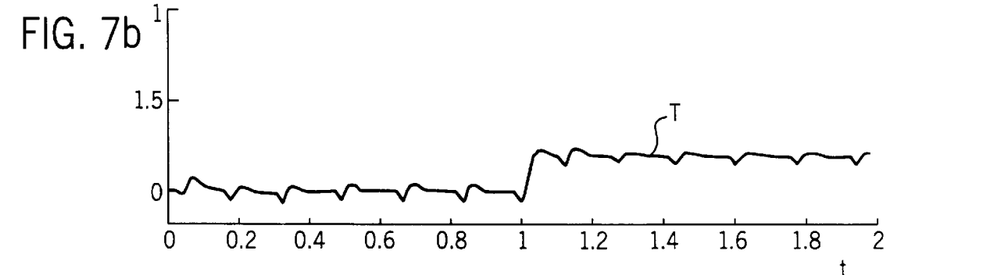

Referring now to FIGS. 7a and 7b, current $i_s$, phase angle $\rho_1$ and resulting torque T are illustrated as a function of time where correction module 96 was not employed and only discriminator 130 was used to identify zero crossing times for turn-on delay compensation purposes. In this case, the turn-on delays were assumed to be of the same duration and $\Delta V$ (see FIG. 4b) was used as the first correction voltage. The fundamental frequency of operation was 2 Hz and the PWM frequency $f_{pwm}$ was set to 4 kHz. At time=1 second a load torque of 0.2 P.U. was applied. The controller kept the commanded voltage and frequency constant (i.e. IR and slip compensation were not implemented).

At three clearly identifiable separate points $t_u$, $t_v$ and $t_w$ during each half cycle of current $i_s$ the current $i_s$ levels off. These points $t_u$, $t_v$ and $t_w$ each correspond to a different zero crossing of the three phase currents $i_u$, $i_v$ and $i_w$. Because current $i_s$ levels off, angle $\rho_1$ deviates from its steady state rate of change at the same times. In FIG. 7b the effect of the current leveling off at $t_u$, $t_v$ and $t_w$ is seen clearly in the calculated motor torque T which pulsates each time current $i_s$ levels off.

Figure 8A:
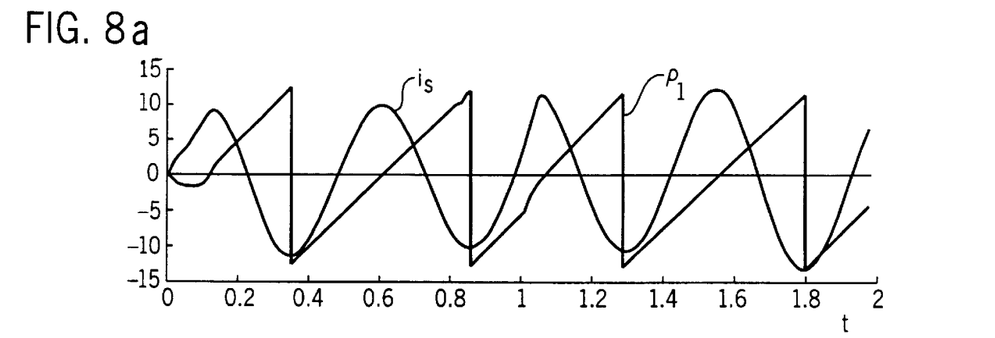
FIGS. 8a and 8b are graphs similar to FIGS. 7a and 7b albeit where the invention is employed.
Figure 8B:
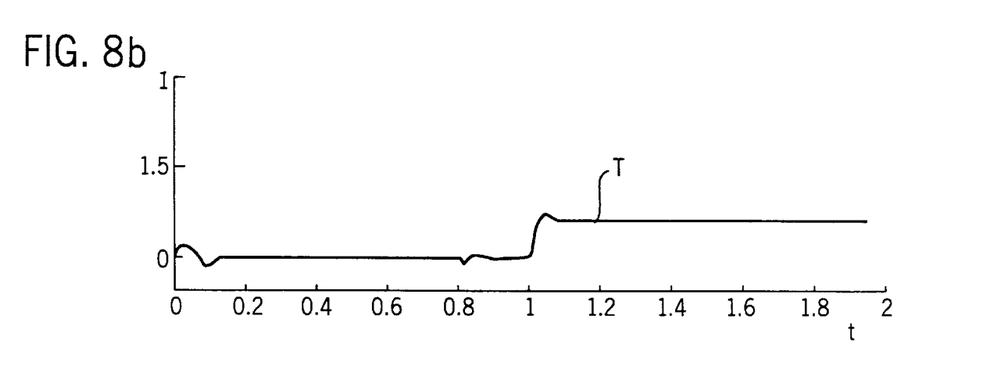

Referring also to FIGS. 8a and 8b, current $i_s$, phase angle $\rho_1$ and resulting torque T are again illustrated as a function of time. However, in this case, the inventive correction module 96 and PLL 92 are employed as described above.

In this case, clearly current $i_s$ does not level off appreciably during operation and the resulting torque T is almost devoid of ripple.

It should be understood that the methods and apparatuses described above are only exemplary and do not limit the scope of the invention, and that various modifications could be made by those skilled in the art that would fall under the scope of the invention. For example, while FIG. 6 shows components for determining zero crossings in two different ways (i.e. identifier 152 and PLL 92 in conjunction with discriminator 138), clearly the present invention could be practiced using components which determine the zero crossing points in a single manner. Most preferably, at start-up identifier 152 is used and thereafter, once iqs and ids reach steady state operation, only the PLL 92 and discriminator 138 are used. PLL 92 and discriminator 138 provide only a single zero crossing point for each current which crosses zero, not a zero crossing period $T_z$. In addition, while separate components are described above, clearly a single microprocessor could and should be used to implement all functionality identified.

To apprise the public of the scope of this invention, we make the following claims:

I claim:

1. An apparatus to be used with a PWM controller which generates terminal voltages as a function of command voltages and thereby produces associated currents in three separate stator windings of an induction motor, the currents representable by a current vector which rotates at a vector frequency, the apparatus for substantially eliminating turn on delay distortions in terminal voltage by modifying command voltages, the apparatus comprising:

a zero crossing identifier for approximately identifying stator winding current zero crossings; a first compensator for modifying the command voltages by a first correction voltage, the first compensator increasing a command voltage between zero crossings when an associated current is positive and decreasing a command voltage between zero crossings when an associated current is negative;

a frequency deviation identifier for identifying irregularities in the vector frequency;

a second compensator for increasing or decreasing the command voltage associated with the next stator current to cross zero by a second correction voltage, the second correction voltage being a function of the vector frequency irregularity magnitude.

2. The apparatus of claim 1 wherein there is an ideal vector frequency and the deviation identifier identifies frequency irregularities by comparing the ideal vector frequency and an actual vector frequency.

3. The apparatus of claim 2 wherein the controller provides stationary two phase feedback stator currents ide and iqe and also provides the ideal vector frequency and the deviation identifier includes an integrator for integrating the ideal vector frequency to provide an ideal phase angle, sine and cosine modules providing the sine and cosine of the ideal phase angle, respectively, the deviation identifier also including first and second multipliers and a summer for comparing the ideal and actual vector frequencies, the first multiplier for mathematically combining two phase current $i_{ds}$ and the sine of the ideal phase angle to provide a first term and the second multiplier for mathematically combining two phase current $i_{qs}$ and the cosine of the ideal phase angle to provide a second term, the summer mathematically combining the first and second terms to provide the vector frequency irregularity.

4. The apparatus of claim 3 wherein the deviation identifier also includes a regulator for exaggerating the vector frequency irregularity prior to providing the irregularity to the second compensator.

5. The apparatus of claim 4 wherein the summer is a first summer, the deviation identifier also includes a second summer, and the controller provides a command frequency, the second summer mathematically combining the command frequency and the vector frequency irregularity to provide the ideal vector frequency.

6. The apparatus of claim 5 wherein the zero crossing identifier includes an angle discriminator which receives and uses the ideal phase angle to provide first, second and third current polarity signals which correspond to the first, second and third motor phases.

7. The apparatus of claim 6 wherein the first, second and third polarity signals are a first signal set, the zero crossing identifier includes a current sensor and first, second and third OR modules and the current sensor provides a second set of first, second and third polarity signals corresponding to the first, second and third motor phases, the first signals of each set provided to the first OR module, the second signals of each set provided to the second OR module and the third signals of each set provided to the third OR module, the outputs of the OR modules being the approximate current zero crossings for the first, second and third motor phases.

8. The apparatus of claim 5 wherein the first and second multipliers mathematically combine by multiplying, the first summer mathematically combines by subtracting the first term from the second term and the second summer mathematically combines by adding.

9. The apparatus of claim 1 wherein the second compensator includes a minimum signal identifier which identifies the minimum absolute value stator current and a selector for selecting the command voltage associated with the minimum current as the command voltage to be altered as a function of the frequency irregularity.

10. A method to be used with a PWM controller which generates terminal voltages as a function of command voltages and thereby produces associated currents in three separate stator windings of an induction motor, the currents representable by a current vector which rotates at a vector frequency, the method for substantially eliminating turn on delay distortions in terminal voltage by modifying command voltages, the method comprising the steps of: approximately identifying stator winding current zero crossings; modifying the command voltages by a first correction voltage which increases a command voltage between zero crossings when an associated current is positive and decreases a command voltage between zero crossings when an associated current is negative; identifying irregularities in the vector frequency; increasing or decreasing the command voltage associated with the next stator current to cross zero by a second correction voltage, the second correction voltage being a function of the vector frequency irregularity magnitude.

11. The method of claim 10 wherein there is an ideal vector frequency and the step of identifying frequency irregularities includes the step of comparing the ideal vector frequency and an actual vector frequency.

12. The method of claim 11 wherein the controller provides stationary two phase stator currents ide and iqe and also provides the ideal vector frequency and the step of identifying frequency irregularities includes the steps of: integrating the ideal vector frequency to provide an ideal phase angle; generating the sine of the ideal phase angle; generating the cosine of the ideal phase angle; mathematically combining two-axis current ide and the sine of the ideal phase angle to provide a first term; mathematically combining two-axis current iqe and the cosine of the ideal phase angle to provide a second term; and mathematically combining the first and second terms to provide the vector frequency irregularity.

13. The method of claim 10 also including the step of, after the frequency irregularity is identified, exaggerating the irregularity prior to increasing or decreasing the command voltage by the second correction voltage.

14. The method of claim 13 wherein the controller provides a command frequency and the step of identifying the irregularities further includes the step of mathematically combining the command frequency and the vector frequency irregularity to provide the ideal vector frequency.

15. The method of claim 14 wherein the step of approximately identifying the stator winding current zero crossing includes the step of using the ideal phase angle to provide first, second and third current polarity signals which correspond to the first, second and third motor phases.

16. The method of claim 15 wherein the controller provides first, second and third phase current signals, the first, second and third polarity signals are a first signal set and the step of approximately identifying further includes the steps of identifying when each of the phase current changes polarity and providing a corresponding second set of first, second and third polarity signals, when either of the first signals or both of the first signals indicates a polarity change, indicating a current zero crossing for the corresponding phase, when either of the second signals or both of the second signals indicates a polarity change, indicating a current zero crossing for the corresponding phase and when either of the third signals or both of the third signals indicates a polarity change, indicating a current zero crossing for the corresponding phase.

17. The method of claim 14 wherein the steps of mathematically combining to provide a first term and to provide a second term include multiplying, the step of mathematically combining the first and second terms includes the step of subtracting the first term from the second term and the step of mathematically combining to provide the ideal vector frequency includes the step of adding the command frequency and the vector frequency irregularity.

* * * * *